United States Patent
Kitamura et al.

(10) Patent No.: US 8,237,374 B2
(45) Date of Patent: Aug. 7, 2012

(54) LED LIGHTING DEVICE AND LIGHTING EQUIPMENT

(75) Inventors: Noriyuki Kitamura, Hadano (JP); Yuji Takahashi, Sagamihara (JP)

(73) Assignee: Toshiba Lighting & Technology Corporation, Kanagawa (JP)

( * ) Notice: Subject to any disclaimer, the term of this patent is extended or adjusted under 35 U.S.C. 154(b) by 418 days.

(21) Appl. No.: 12/550,691

(22) Filed: Aug. 31, 2009

(65) Prior Publication Data
US 2010/0052566 A1 Mar. 4, 2010

(30) Foreign Application Priority Data

Sep. 4, 2008 (JP) ................................. 2008-227017
Jul. 15, 2009 (JP) ................................. 2009-167101

(51) Int. Cl.
*H05B 39/00* (2006.01)
(52) U.S. Cl. ......... 315/291; 315/306; 315/307; 315/247
(58) Field of Classification Search .................. 315/247, 315/224, 291, 308, 294–295, 200 R, 306, 315/307, 209 R; 363/15, 16, 21.02, 21.03, 363/80, 79
See application file for complete search history.

(56) References Cited

U.S. PATENT DOCUMENTS

| 6,504,732 B2 * | 1/2003 | Abe ................................. 363/17 |
| 7,772,782 B2 * | 8/2010 | Chu et al. ...................... 315/247 |
| 7,990,070 B2 * | 8/2011 | Nerone ......................... 315/247 |
| 8,014,176 B2 * | 9/2011 | Melanson et al. ......... 363/21.02 |
| 2008/0084167 A1 | 4/2008 | Waffenschmidt et al. |

FOREIGN PATENT DOCUMENTS

| EP | 1791399 A1 | 5/2007 |
| JP | 2006210836 A | 8/2006 |

* cited by examiner

*Primary Examiner* — James H Cho
(74) *Attorney, Agent, or Firm* — McDermott Will & Emery LLP

(57) ABSTRACT

An LED lighting device including a DC power source circuit, a high frequency generation circuit which includes an inverter circuit having switching elements and a resonance circuit having a series-connected inductor and condenser, in which the switching elements are on-off controlled by a no-load resonance frequency of the resonance circuit, and DC voltage input from the DC power source circuit is converted into a high frequency AC voltage, a rectification smoothing circuit having an input side which is connected between both edges of the condenser or both edges of the inductor; and a light emitting diode series connected to an output side of the rectification smoothing circuit.

4 Claims, 6 Drawing Sheets under 35 U.S.C. §119
LED LIGHTING DEVICE AND LIGHTING EQUIPMENT

INCORPORATION BY REFERENCE

The present invention claims priority under 35 U.S.C. §119 to Japanese Patent Application Nos. 2008-227017 and 2009-167101 filed on Sep. 4, 2008 and Jul. 15, 2009, respectively. The contents of these applications are incorporated herein by reference in their entirety.

FIELD OF THE INVENTION

The present invention relates to an LED lighting device which allows a light emitting diode to emit light by a constant current and a lighting equipment mounting this LED lighting device.

BACKGROUND OF THE INVENTION

As this type of an LED lighting device, there is known a device which, for example, detects current flowing in a light emitting diode (LED) and controls the detected current so that the current becomes a desired value or a predetermined value to obtain a desired light output or a predetermined light output from the light emitting diode. For example, as disclosed in Japanese Laid-Open Patent Publication No. 2006-210836, there is proposed an LED driving device having a control means for carrying out constant power control by controlling a power source means for supplying a drive voltage and a drive current to an LED so that power consumption which is a product of the drive voltage detected by a voltage detection means and a drive current detected by a current detection means becomes constant.

The LED driving device according to the above-described Japanese Laid-Open Patent Publication No. 2006-210836 can control power consumption of the LED to be constant by feedback control of the voltage detection means, the current detection means, and the control means. However, there are disadvantages that the number of components is increased due to provision of the voltage detection means, the current detection means, and the control means and due to these means, cost of the device is also increased.

Moreover, from a viewpoint of resource saving, an LED lighting device which has an LED with constant light output and does not require variability of light output has been demanded.

The object of the present invention is to provide an LED lighting device which can carry out constant current control of a light emitting diode without especially carrying out detection or control of the light emitting diode and a lighting equipment including this LED lighting device.

SUMMARY OF THE INVENTION

The present invention includes a DC power source circuit; a high frequency generation circuit including an inverter circuit having a switching element and a resonance circuit having a series-connected inductor and condenser, in which the switching element is on-off controlled by a frequency within a predetermined frequency band including a no-load resonance frequency of the resonance circuit, and DC voltage input from the DC power source circuit is converted into a high frequency AC voltage; a rectification smoothing circuit having an input side which is connected between both edges of the condenser or both edges of the inductor so that the input high frequency AC voltage is rectified and smoothed for output; and a light emitting diode series connected to an output side of the rectification smoothing circuit.

Each of the components in the present invention and the following invention will be as follows unless otherwise mentioned.

The DC power source circuit may be any circuit as long as DC voltage is output therefrom.

The inductor includes a secondary winding and the rectification smoothing circuit may be connected between both ends of the secondary winding. In a case where the inductor is formed with a single winding, the rectification smoothing circuit is connected between both ends of the single winding.

The predetermined frequency band including no-load resonance frequency means no-load resonance frequencies and frequencies in the vicinity thereof. Thus, a width (range) of target current which flows in the light emitting diode is permitted. That is, the width is not strictly limited by the no-load resonance frequency and the target current.

There may be provided one light emitting diode. In this case, the one light emitting diode is connected between outputs of the rectification smoothing circuit.

Moreover, a plurality of series-connected light emitting diodes may be parallel connected on the output side of the rectification smoothing circuit as long as forward voltage (Vf) of all of the series-connected light emitting diodes is approximately similar. However, in a case where there are a plurality of series-connected light emitting diodes, it is preferable that the resonance circuit, the rectification smoothing circuit, and the series-connected light emitting diodes are connected in parallel to the inverter circuit.

According to the present invention, because the switching element of the inverter circuit is on-off operated by the frequency within a predetermined frequency band including a no-load resonance frequency of the inductor and the condenser, a constant current flows to the resonance circuit. The constant current is rectified and smoothed by the rectification smoothing circuit and flows to the light emitting diode. That is, by the above-described on-off operation of the switching element, the constant current flows to the resonance circuit and therefore the constant current is output from the rectification smoothing circuit. Thus, irrespective of the number or type of the light emitting diodes, the constant current flows to the light emitting diode. Therefore, it becomes unnecessary to provide a voltage detection means, a current detection means, and a control means for feedback control and the number of components is reduced. As a result thereof, the LED lighting device can be made smaller inexpensively.

Moreover, the predetermined frequency band in the present invention is set to ±5% with respect to the no-load resonance frequency.

According to the present invention, setting the predetermined frequency band to ±5% with respect to the no-load resonance frequency enables to sufficiently ensure a frequency bandwidth for flowing the constant current to the light emitting diode.

Further, the present invention includes the LED lighting device; and an equipment main body in which a light emitting diode of this LED lighting device is provided.

In the equipment main body, components of the LED lighting device excluding the light emitting diode may configure a unit to be provided to the equipment.

According to the present invention, since the LED lighting device is mounted, it becomes possible to obtain a certain amount of light output from each of the light emitting diodes, as well as to provide an inexpensive lighting equipment.

DETAILED DESCRIPTION OF THE PREFERRED EMBODIMENTS

Hereinafter, embodiments of the present invention will be described with reference to the drawings. An embodiment of the present invention will be described.

Figure 1:
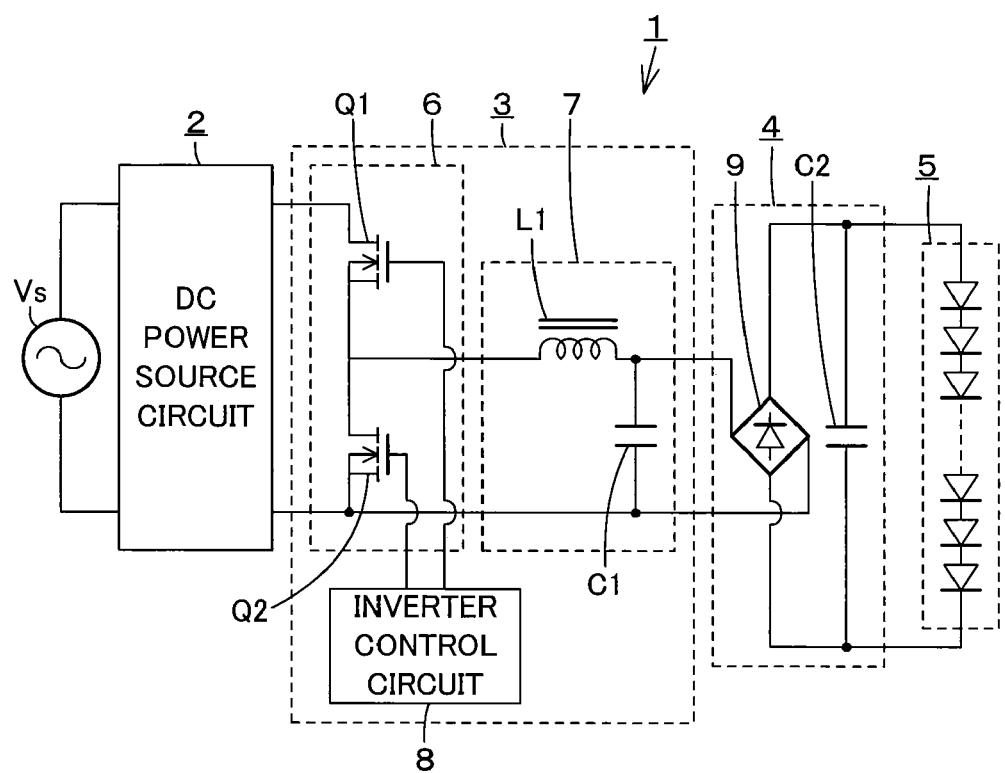
FIG. 1 is a schematic circuit diagram of an LED lighting device showing an embodiment of the present invention.
Figure 2:
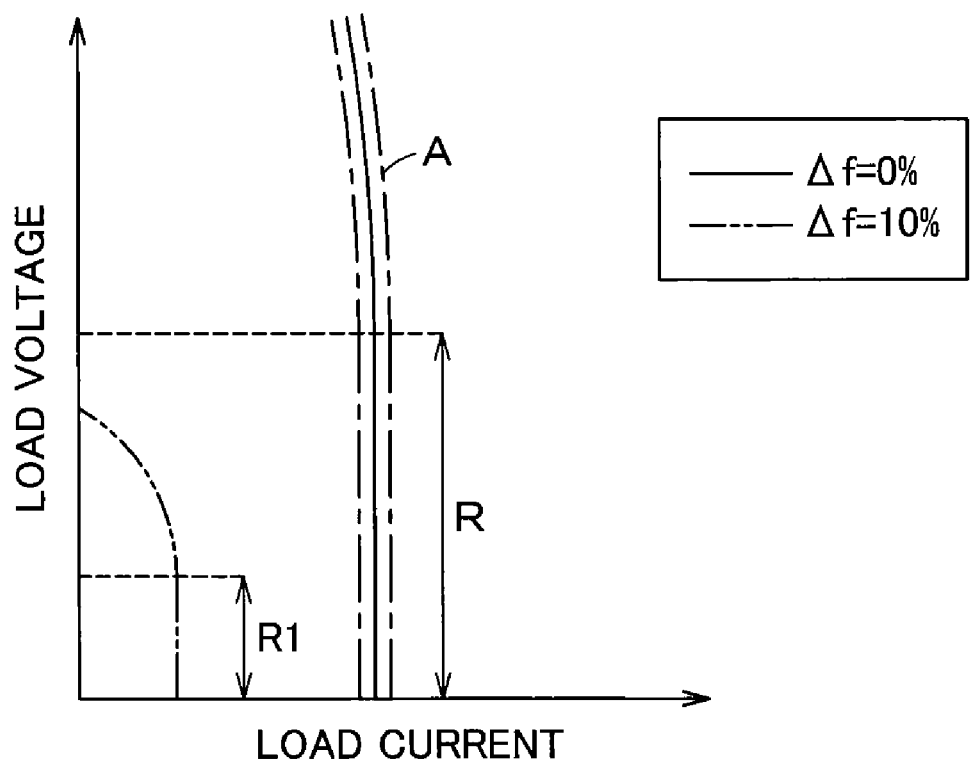
FIG. 2 is a graph showing correspondence between a difference between a no-load resonance frequency and an operation frequency and load characteristics.

FIG. 1 is a schematic circuit diagram of an LED lighting device showing an embodiment of the present invention and FIG. 2 is a graph showing correspondence between a difference between a no-load resonance frequency and an operation frequency and load characteristics. An LED lighting device 1 includes a DC power source circuit 2, a high frequency generation circuit 3, a rectification smoothing circuit 4, and light emitting diodes 5.

The DC power source circuit 2 is connected to an alternate current power source Vs and converts AC voltage from the alternate current power source Vs into DC voltage for output. The DC power source circuit 2 is formed in a known circuit configuration such as a rectifier and a smoothing condenser for smoothing an output voltage from the rectifier, a rectifier and a chopper circuit for raising and lowering an output voltage from the rectifier, or the like.

The high frequency generation circuit 3 includes an inverter circuit 6, a resonance circuit 7, and an inverter control circuit 8. The inverter circuit 6 includes switching elements Q1 and Q2 series-connected between outputs of the DC power source circuit 2. The switching elements Q1 and Q2 are, for example, field-effect transistors. Control terminals (gates) of the switching elements Q1 and Q2 are connected to the inverter control circuit 8.

The resonance circuit 7 includes a series circuit of an inductor L1 and a condenser C1 and is connected between both ends of the switching element Q2. Then, the inverter control circuit 8 is formed to alternately on-off control the switching elements Q1 and Q2 of the inverter circuit 6 with the no-load resonance frequency $f_0$ of the resonance circuit 7. The no-load resonance frequency $f_0$ is determined by $1/(2\pi \times (L_0 \times C_0)^{1/2})$. Here, $L_0$ is an inductance value of the inductor L1 and $C_0$ is a capacitance value of the condenser C1.

When the switching elements Q1 and Q2 are on-off controlled by the no-load resonance frequency $F_0$, DC voltage input from the DC power source circuit 2 is converted into a high frequency AC voltage and is generated between both ends of the condenser C1. Thus, a high-frequency alternate constant current flows to the resonance circuit 7. A current value of the constant current is determined by the inductance value $L_0$ of the inductor L1 and the capacitance value $C_0$ of the condenser C1.

Here, even if the switching elements Q1 and Q2 are on-off controlled by a frequency in the vicinity of the no-load resonance frequency $f_0$, that is, approximate no-load resonance frequency $f_1$, a high-frequency alternate current flows to the resonance circuit 7.

Here, if the switching elements Q1 and Q2 are on-off controlled by the no-load resonance frequency $f_0$, ideally (if there is no loss), an open voltage becomes infinite and the high frequency alternate current which flows to the resonance circuit 7 becomes a constant current. However, a loss is actually generated and therefore the current does not become a perfect constant current but becomes a pseudo-constant current. As shown in FIG. 2, the larger the difference amount $\Delta f$ with respect to the no-load resonance frequency $f_0$ becomes, the more the load characteristics incline away from ideal load characteristics and the current draws apart from ideal constant current characteristics. Therefore, it becomes possible to sufficiently ensure a range R in which the high frequency alternate current flowing to the resonance circuit 7 can be used as an approximate constant current compared to a case of a range R1 where, for example, the difference amount $\Delta f=10\%$, by setting the frequency band for which the approximate no-load resonance frequency $f_1$ is set to ±5% with respect to the no-load resonance frequency $f_0$ (area A in the figure). That is, if the approximate no-load resonance frequency f1 is within the above mentioned frequency band, it becomes possible to assume a high frequency alternate current which flows to the resonance circuit 7 as substantially a constant current within a range of usage of the LED lighting device 1.

The rectification smoothing circuit 4 shown in FIG. 1 includes a rectifier 9 and a condenser C2. Then, an input side of the rectifier 9 is parallelly connected between both ends of the condenser C1 of the resonance circuit 7 and the condenser C2 is connected to an output side of the rectifier 9. The rectification smoothing circuit 4 rectifies and smoothes a high frequency alternate current voltage input from the condenser C1 (high frequency alternate constant current) and outputs a certain amount of DC voltage (direct constant current). The rectification smoothing circuit 4 parallelly connected to the condenser C1 includes not only the constitution wherein the rectification smoothing circuit 4 is directly and parallelly connected to the condenser C1, but also the constitution wherein the rectification smoothing circuit 4 is indirectly and parallelly connected to the condenser C1.

A plurality of light emitting diodes 5 are connected in series and are connected between outputs of the rectification smoothing circuit 4. The light emitting diode 5 is lit by the constant current flowing which is supplied from the rectification and smoothing circuit 4. Here, because the resonance circuit 7 outputs a high frequency alternate constant current, it is preferable that a protection circuit for a case where any of the light emitting diodes 5 is damaged and opened is provided to the light emitting diodes 5 so that the circuit is protected even in the case of damage from exposure.

Next, operation of the embodiment of the present invention will be described.

The inverter control circuit 8 of the high frequency generation circuit 3 alternately on-off controls the switching elements Q1 and Q2 of the inverter circuit 6 by the no-load resonance frequency $f_0$ of the resonance circuit 7. Thus, a high frequency alternate constant current flows to the resonance circuit 7. The high frequency alternate constant current is rectified and smoothed by the rectification smoothing circuit 4. The rectification smoothing circuit 4 supplies a DC constant current to the light emitting diodes 5. The constant current flows into each of the series-connected light emitting diodes 5 and the diodes are lit with an approximately similar light output.

Then, since the switching elements Q1 and Q2 of the inverter circuit 6 are on-off controlled by the no-load resonance frequency $f_0$ or the approximate no-load resonance frequency $f_1$, irrespective of the number of the series-connected light emitting diodes 5, a constant current is supplied from the rectification smoothing circuit 4. Therefore, appropriate selection of the number of the series-connected light emitting diodes 5 enables to set a desired light (illuminance) by an emitted light from the light emitting diodes 5.

Because a current detection circuit for detecting a current flowing into the light emitting diodes 5 or a voltage detection circuit for detecting a voltage, for example, between both ends of the light emitting diodes 5 which is proportional to the current is not provided and a control means for controlling the device so that a constant current flows into the light emitting diodes 5 on the basis of the detection result of the current detection circuit or the voltage detection circuit is not configured, the number of components of the circuit is reduced. Moreover, since the inverter control circuit 8 only on-off controls the switching elements Q1 and Q2 of the inverter circuit 6 alternately by the no-load resonance frequency $f_0$ (approximate no-load resonance frequency $f_1$), the circuit configuration is simple. Therefore, the LED lighting device 1 can be made smaller inexpensively to the extent that the number of components is reduced and the configuration of the inverter control circuit 8 is simple.

Further, since the inverter circuit 6 includes two switching elements Q1 and Q2, on-off operation by the no-load resonance frequency $f_0$ can be carried out better than an inverter circuit having one switching element. Thus, it becomes possible to reduce loss of the switching elements Q1 and Q2 and to suppress generation of noise.

Further, since the frequency band for which the operation frequency of the resonance circuit 7 is set is set to ±5% with respect to the no-load resonance frequency $f_0$, it becomes possible to sufficiently ensure a frequency bandwidth for flowing a constant current to the light emitting diodes 5.

Next, another embodiment of the present invention will be described.

Figure 3:
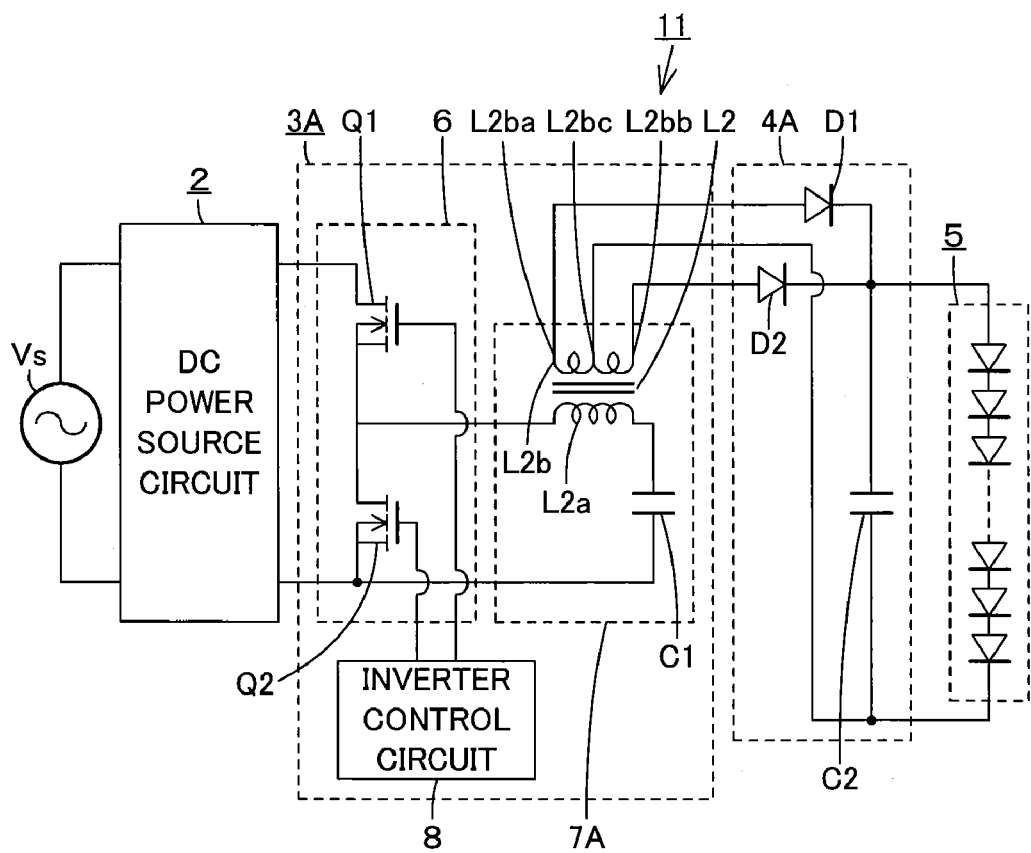
FIG. 3 is a schematic circuit diagram of an LED lighting device showing another embodiment of the present invention.

FIG. 3 is a schematic circuit diagram of an LED lighting device showing the embodiment of the present invention. Here, the same reference numerals are given to components the same as those in FIG. 1 and description thereof is omitted.

An LED lighting device 11 shown in FIG. 3 includes an inductor L2 having a secondary winding L2b instead of the inductor L1 of the resonance circuit 7 of the high frequency generation circuit 3A and diodes D1 and D2 for rectification instead of the rectifier 9 of the rectification smoothing circuit 4 in the LED lighting device 1 shown in FIGS. 1 and 2. In other words, a resonance circuit 7A includes the inductor L2 and the condenser C1 and a first winding L2a of the inductor L2 and the series circuit of the condenser C1 are connected between both ends of the switching element Q2 of the inverter circuit 6.

Then, a tap L2ba on one end side and a tap L2bb on the other end side of the secondary winding L2b of the inductor L2 are connected to anode sides of the diodes D1 and D2 respectively while the cathode side of the diodes D1 and D2 are connected to the positive electrode side of the condenser C2. Moreover, a tap L2bc on the central side of the secondary winding L2b of the inductor L2 is connected to the negative electrode side of the condenser C2. In other words, a rectification smoothing circuit 4A is parallelly connected to the secondary winding L2b of the inductor L2. The rectification smoothing circuit 4A parallelly connected to the inductor L2 includes not only the constitution wherein the rectification smoothing circuit 4A is directly and parallelly connected to the inductor L2, but also the constitution wherein the rectification smoothing circuit 4A is indirectly and parallelly connected to the inductor L2.

The inverter control circuit 8 alternately on-off controls the switching elements Q1 and Q2 of the inverter circuit 6 by a series no-load resonance frequency $f_0$ (approximate no-load resonance frequency $f_1$) of the inductor L2 and the condenser C1. Thus, a high frequency alternate constant current flows to the resonance circuit 7A. This high frequency alternate constant current is induced by the secondary winding L2b of the inductor L2 and is input into the rectification smoothing circuit 4A. Then, the current is rectified by the diodes D1 and D2 of the rectification smoothing circuit 4A, smoothed by the condenser C2, and is converted into a direct constant current. Hereinafter, the present embodiment will have a similar operation and effects to those of the LED lighting device 1 of FIGS. 1 and 2.

Next, a further embodiment will be described.

Figure 4:
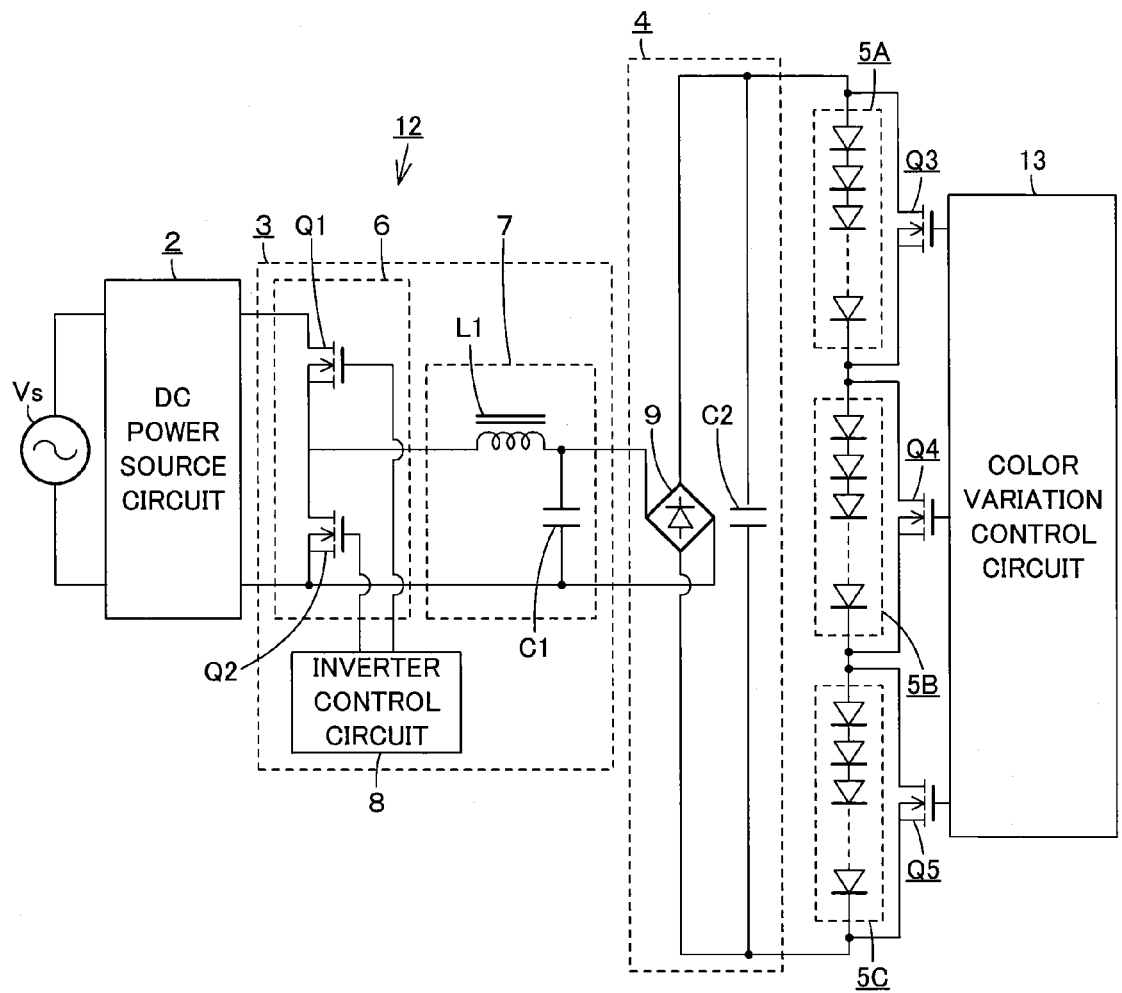
FIG. 4 is a schematic circuit diagram of an LED lighting device showing a further embodiment of the present invention.
Figure 5:
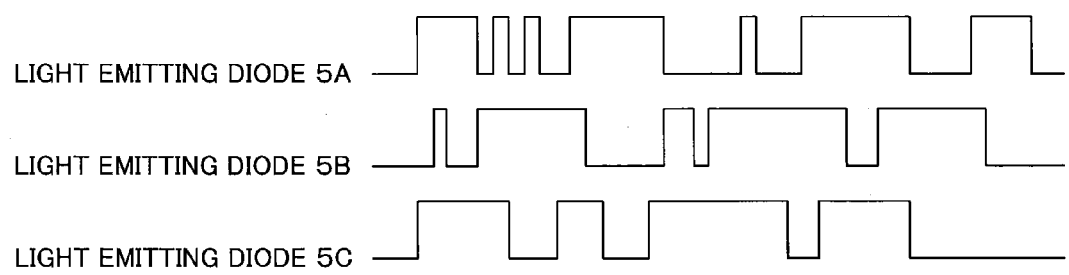
FIG. 5 is a timing chart showing an example of control of a light emitting diode.

FIG. 4 is a schematic circuit diagram showing the embodiment of the present invention and FIG. 5 is a timing chart showing an example of control of each of the light emitting diodes. Here, the same reference numerals are given to components the same as those in FIG. 1 and description thereof is omitted.

In an LED lighting device 12 shown in FIGS. 4 and 5, a plurality of types of light emitting diodes 5A, 5B, and 5C having different emission colors are connected in series between outputs of the rectification smoothing circuit 4 of the LED lighting device 1 shown in FIGS. 1 and 2. The light emitting diodes 5A, 5B, and 5C respectively include a plurality of light emitting diodes having the same emission color which are connected in series. The light emitting diode 5A is formed so as to emit red (R) colored light. Moreover, the light emitting diode 5B is formed so as to emit green (G) colored light, and the light emitting diode 5C is formed so as to emit blue (B) colored light.

Then, between ends of each of the light emitting diodes 5A, 5B, and 5C, field-effect transistors Q3, Q4, and Q5 as an open and close means are connected. Respective control terminals (gates) of the field-effect transistors Q3, Q4, and Q5 are connected to a color variation control circuit 13 as a control circuit.

The color variation control circuit 13 is configured so as to control on-off operation (open and close operation) of the field-effect transistors Q3, Q4, and Q5 respectively in response to an external signal transmitted from a switch on a wall or a remote controller (not shown). In other words, if all the field-effect transistors Q3, Q4, and Q5 are off-controlled by the color variation control circuit 13, both ends of each of the light emitting diodes 5A, 5B, and 5C are released from the field-effect transistors Q3, Q4, and Q5 and all the light emitting diodes 5A, 5B, and 5C are connected in series during output from the rectification smoothing circuit 4.

Moreover, if the field-effect transistor Q3 is off-controlled and the field-effect transistors Q4 and Q5 are on-controlled, both ends of the light emitting diode 5A are released from the field-effect transistor Q3, both ends of each of the light emitting diodes 5B and 5C are short-circuited by the field-effect transistors Q4 and Q5, and the light emitting diode 5A is connected between outputs of the rectification smoothing circuit 4. Similarly, if the field-effect transistor Q4 is off-controlled and the field-effect transistors Q3 and Q5 are on-controlled, the light emitting diode 5B is connected between outputs of the rectification smoothing circuit 4, and if the field-effect transistor Q5 is off-controlled and the field-effect transistors Q3 and Q4 are on-controlled, the light emitting diode 5C is connected between outputs of the rectification smoothing circuit 4.

Next, operation of the embodiment of the present invention will be described.

If all the field-effect transistors Q3, Q4, and Q5 are off-controlled by the color variation control circuit 13, the light emitting diodes 5A, 5B, and 5C are connected between outputs of the rectification smoothing circuit 4. Then, the series-connected light emitting diodes 5A, 5B, and 5C are lit when a constant current from the rectification smoothing circuit 4 flows. Red, green, and blue colored lights respectively having a certain amount of light output are emitted from each of the light emitting diodes 5A, 5B, and 5C, although the amount of the light output differs from each other. Each of the colored lights are mixed and emitted as a desired color light such as white colored light.

Then, if the field-effect transistor Q3 is off-controlled and the field effect transistors Q4 and Q5 are on-controlled, the constant current from the rectification smoothing circuit 4 flows through a path of the light emitting diode 5A, the field-effect transistor Q4, and the field effect transistor Q5. Thus, the light emitting diode 5A is lit and the light emitting diodes 5B and 5C are turned off. Then, red colored light with a certain amount of light output is emitted from the light emitting diode 5A.

Moreover, if the field-effect transistor Q4 is off-controlled and the field effect transistors Q3 and Q5 are on-controlled, the constant current from the rectification smoothing circuit 4 flows through a path of the field-effect transistor Q1, the light emitting diode 5B, and the field effect transistor Q5. Thus, the light emitting diode 5B is lit and the light emitting diodes 5A and 5C are turned off. Thus, green colored light with a certain amount of light output is emitted from the light emitting diode 5B.

Further, if the field-effect transistor Q5 is off-controlled and the field effect transistors Q3 and Q4 are on-controlled, the constant current from the rectification smoothing circuit 4 flows through a path of the switching element (field-effect transistor) Q1, the switching element (field-effect transistor) Q2, and the light emitting diode 5C. Thus, the light emitting diode 5C is lit and the light emitting diodes 5A and 5B are turned off. Thus, blue colored light with a certain amount of light output is emitted from the light emitting diode 5C.

In other words, it becomes possible to carry out light emission control independently by the light emitting diodes 5A, 5B, and 5C independently performing PWM controls of the field-effect transistors Q3, Q4, and Q5, as shown in FIG. 5.

As mentioned above, the LED lighting device 12 can emit different colored lights such as red, green, and blue colored lights from each of the light emitting diodes 5A, 5B, and 5C having different emission colors in response to on-off operation (open and close operation) of the field-effect transistors Q3, Q4, and Q5 by the color variation control circuit 13. Moreover, since the constant current from the rectification smoothing circuit 4 flows to each of the light emitting diodes 5A, 5B, and 5C, the device can emit each of different colored lights of red, green, and blue colored lights with a certain light output and LED current rise is very quickly carried out.

Further, since each of the light emitting diodes 5A, 5B, and 5C is constituted without the current detection circuit and the voltage detection circuit provided because a constant current flows to the respective light emitting diodes, the LED lighting device 12 can be made smaller inexpensively to the extent that the number of components of the circuit such as the current detection circuit and the voltage detection circuit is reduced.

Next, another embodiment of the present invention will be described.

Figure 6:
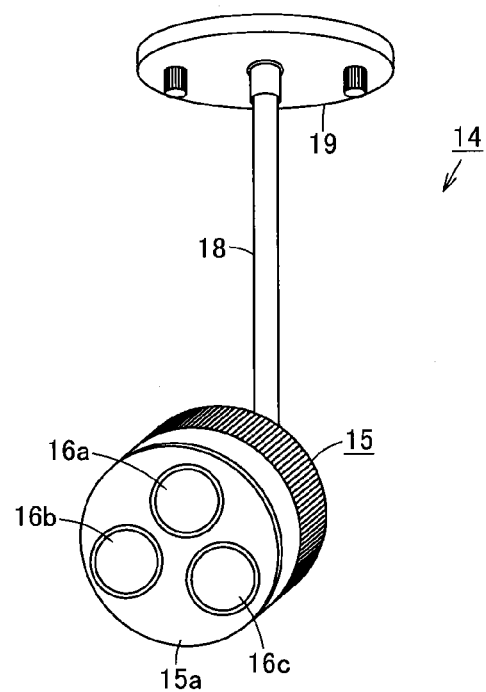
FIG. 6 is a schematic perspective view of a lighting equipment showing another embodiment of the present invention.
Figure 7:
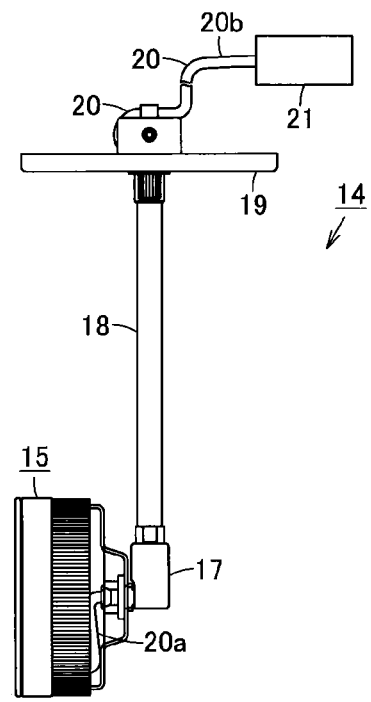
FIG. 7 is a view of the lighting equipment with parts broken away for the sake of clarity.

FIG. 6 is a schematic perspective view of a lighting equipment showing an embodiment of the present invention, and FIG. 7 is a view of the lighting equipment with parts broken away for the sake of clarity. Here, the same reference numerals are given to components the same as those in FIG. 4 and description thereof is omitted.

A lighting equipment 14 shown in FIG. 6 is a spotlight attached to a constructed object such as ceiling. Inside an equipment main body 15 formed to have an approximately cylindrical shape, the light emitting diodes 5A, 5B, and 5C shown in FIG. 4 are modulized to be provided. Then, on a front surface 15a of the equipment main body 15, apertures 16a, 16b, and 16c for respectively emitting red, green and blue colored lights which are emitted from the light emitting diodes 5A, 5B, and 5C are formed.

The equipment main body 15 is fixed to an arm 18 via a joint 17 while being enabled to freely rotate, as shown in FIG. 7. Then, the arm 18 is fixed to a flange 19. The flange 19 is fixed to a plate (not shown) provided on the back side of the ceiling so as to sandwich the ceiling.

Then, one end side 20a of a power source code 20 is introduced inside the arm 18 from the back side of the ceiling and is inserted through the arm 18 to be further introduced inside the equipment main body 15 and to be connected to the light emitting diodes 5A, 5B, and 5C. The other end side 20b of the power source code 20 is connected to a lighting unit 21. The lighting unit 21 is configured similar to the LED lighting device 12 shown in FIGS. 4 and 5, although the light emitting diodes 5A, 5B, and 5C are excluded therefrom.

The lighting equipment 14 emits different colored lights such as red, green, and blue colored lights respectively from the apertures 16a, 16b, and 16c on the front surface 15a of the equipment main body 15. Each of the colored lights is a certain light output and can illuminate an illumination target such as a display independently or in a mixed manner. Thus, it becomes possible to improve productive illumination to the illumination target. Moreover, since the equipment includes the LED lighting device 12 shown in FIG. 3, the lighting equipment 14 can be manufactured inexpensively.

Here, the lighting equipment including the LED lighting device 12 is not limited to the lighting equipment 14 of the above-described spotlight but may be used for a general lighting equipment such as a lighting equipment for creating an atmosphere. Further, since the LED lighting device 12 can emit red, green, and blue colored lights independently, the device may be used for a traffic signal, a sign light, or an indicator light.

What is claimed is:
1. An LED lighting device comprising:
a DC power source circuit;
a high frequency generation circuit including an inverter circuit having a switching element and a resonance circuit having a series-connected inductor and condenser, in which the switching element is on-off controlled by a frequency within a frequency band at ±5% with respect to a no-load resonance frequency of the resonance circuit, and DC voltage input from the DC power source circuit is converted into a high frequency AC voltage;
a rectification smoothing circuit having an input side which is parallelly connected to the condenser or inductor so that the input high frequency AC voltage is rectified and smoothed for output;
a light emitting diode series connected to an output side of the rectification smoothing circuit; and a protection circuit performing a protecting operation for a case where the light emitting diode is damaged.

2. A lighting equipment comprising:

the LED lighting device according to claim 1; and an equipment main body in which a light emitting diode of the LED lighting device is provided.

3. The LED lighting device according to claim 2 comprising:

a plurality of light source portions respectively including a plurality of light emitting diodes having a same emission color and being set to different emission colors from each other;

a plurality of open-and-close elements connected between ends of each of the plurality of the light source portions; and a control circuit controlling the plurality of open-and-close elements.

4. The LED lighting device according to claim 1 comprising:

a plurality of light source portions respectively including a plurality of light emitting diodes having a same emission color and being set to different emission colors from each other;

a plurality of open-and-close elements connected between ends of each of the plurality of the light source portions; and a control circuit controlling the plurality of open-and-close elements.

* * * * *